United States Patent [19]
Larson

[11] Patent Number: 4,756,275
[45] Date of Patent: Jul. 12, 1988

[54] MILKING INFLATION

[76] Inventor: Leigh R. Larson, 110 Lincoln St., Johnson Creek, Wis. 53038

[21] Appl. No.: 904,496

[22] Filed: Sep. 8, 1986

Related U.S. Application Data

[63] Continuation-in-part of Ser. No. 793,196, Oct. 31, 1985, abandoned.

[51] Int. Cl.⁴ .............................................. A01J 5/04
[52] U.S. Cl. .............................. 119/14.49; 119/14.51
[58] Field of Search ................ 119/14.47, 14.51, 14.49

[56] References Cited

U.S. PATENT DOCUMENTS

| | | | |
|---|---|---|---|
| 2,099,884 | 11/1937 | Green | 31/84 |
| 2,164,706 | 7/1939 | Flint et al. | 119/14.49 |
| 2,341,953 | 2/1944 | Scott | 31/84 |
| 2,694,379 | 11/1954 | Hein | 119/14.47 |
| 3,096,740 | 7/1963 | Noorlander | 119/14.49 |
| 3,611,993 | 10/1971 | Norton | 119/14.36 |
| 4,196,696 | 4/1980 | Olander | 119/14.51 |
| 4,303,038 | 12/1981 | Thompson et al. | 119/14.49 |
| 4,324,201 | 4/1982 | Larson | 119/14.51 |
| 4,372,250 | 2/1983 | Larson | 119/14.47 |

Primary Examiner—Carl D. Friedman
Assistant Examiner—Caroline D. Dennison
Attorney, Agent, or Firm—Glenn A. Buse'

[57] ABSTRACT

The milking tube section of a milking inflation includes an elongated stem portion having a claw end portion which has an upper end located above the outer end of a milker claw nipple when installed thereon. The stem portion has a circumferentially extending, generally V-shaped groove at a location near the lower end of a teat cup shell in which the inflation is installed and/or at a location adjacent the upper end of the claw end portion. These grooves are arranged to permit substantial relative bending of portions adjacent each groove without substantial crimping which causes a reduction in the internal cross sectional area of the flow passage extending through the milking tube section. The resulting flexibility facilitates installation of a teat cup assembly on a cow's teat and provides improved teat-hanging characteristics.

9 Claims, 1 Drawing Sheet

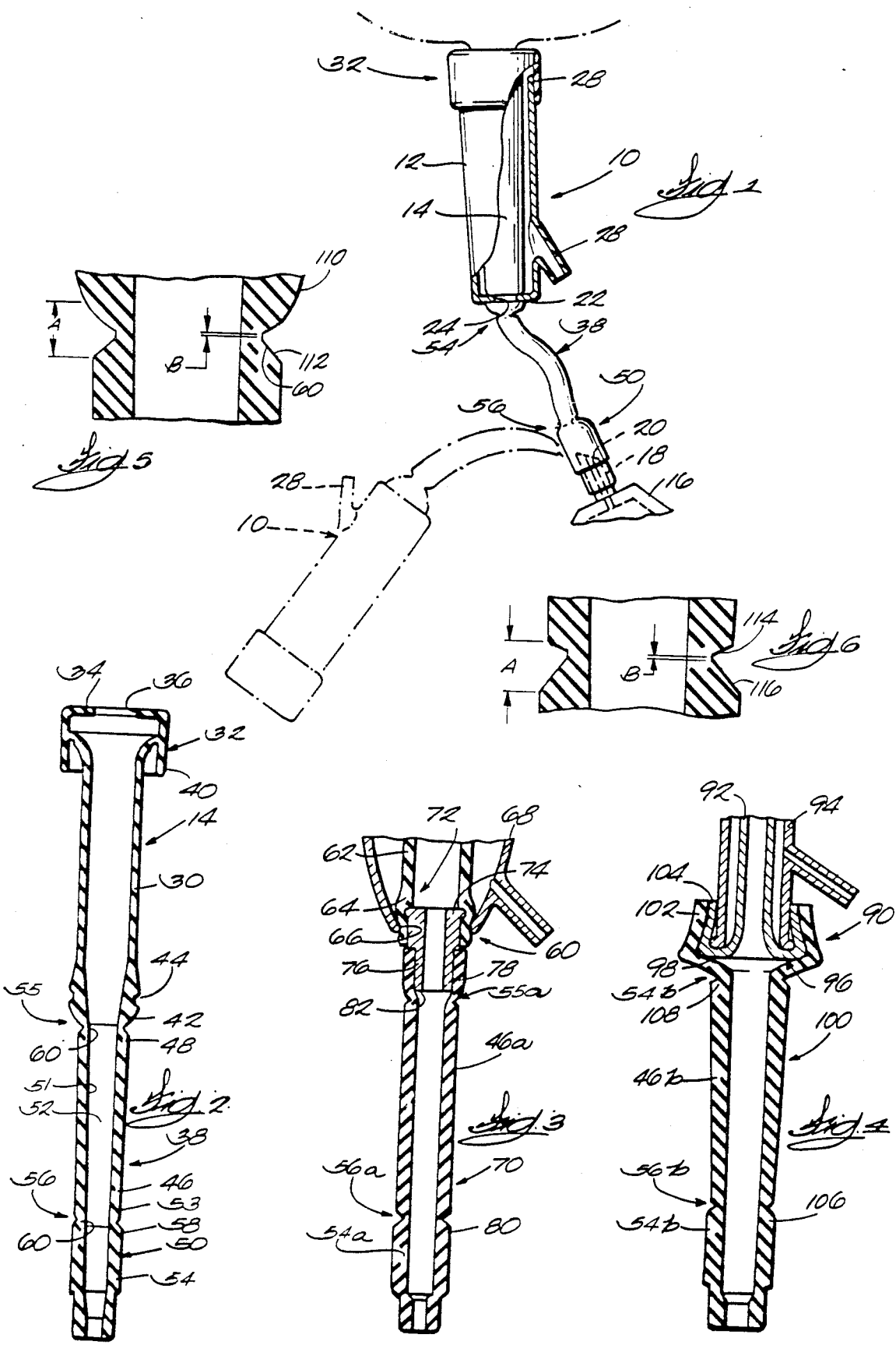

MILKING INFLATION

CROSS REFERENCE TO RELATED APPLICATION

This is a continuation-in-part of application Ser. No. 793,196, filed Oct. 31, 1985, now abandoned.

BACKGROUND OF THE INVENTION

This invention relates to liners or inflations for teat cup assemblies of vacuum-operated milking machines and, more particularly, to such liners or inflations including a milking tube section which extends from a teat cup shell and is attached to the nipple of the milking machine claw.

Automatic milking machines employ teat cup assemblies including a hollow, rigid outer shell which is attached to a pulsating vacuum line and a resilient, tubular liner or inflation installed in the shell in a manner to form a seal at both ends of the shell. The cow's teat is inserted into the upper end of the inflation and the lower end is connected to a so-called claw of milking machine. During the milking operation, the teat cup assembly is suspended from a cow's teat, primarily by the engagement between an opening or mouth in the upper or head end of the inflation and the cow's teat and milk flows through the inflation under the influence of a vacuum maintained in the milking machine claw.

One type inflation is a one-piece unit including an upper or shell section adapted to fit inside the shell and a lower or milking tube section which is pulled through and extends from an opening in the lower end of the shell and is adapted to be connected to the nipple of the milking claw.

Another type inflation includes an upper or shell section having a lower end which fits through an opening in the lower end of the shell and a separate milking tube section which is connected to the lower end of the shell section via a rigid, sleeve connector which is press-fitted inside the lower end of the shell section.

A further type inflation includes an upper shell section having a lower end which is adapted to be folded back over the open lower end of the shell and a separate milking tube section having a cup-shaped upper end adapted to fit over the folded back portion of the shell section.

The following United States patents are representative of prior art constructions for milking tube sections of milking inflations:

| Patentee | Patent No. | Issue Date |
|---|---|---|
| Green | 2,099,884 | November 23, 1937 |
| Scott | 2,341,953 | February 15, 1944 |
| Hein | 2,694,379 | November 16, 1954 |
| Norton | 3,611,993 | October 12, 1971 |
| Olander | 4,196,696 | April 8, 1980 |
| Larson | 4,324,201 | April 13, 1982 |
| Larson | 4,372,250 | February 8, 1983 |

Originally, the inside diameter of the flow passage through the milking tube section of milking inflations could be relatively small because milk flow was quite small. The milking tube section was quite flexible because the small inside diameter permitted the walls to be made relatively thin and still not collapse when subjected to a vacuum during the milking operation. This flexibility permitted the teat cup to be conveniently lifted up and slipped onto a cow's teat without imparting a significant side force on the teat.

Modern dairy cows produce milk at substantially higher flows and, consequently, it has become necessary to increase the inside diameter of the milking tube section in order to accommodate this increase in milk flow. As the inside diameter of the milking tube increases, the wall thickness also must be increased to prevent the walls from collapsing during the milking operation. The increased wall thickness makes the milking tube section relatively stiff.

This stiffness resists movement of the shell into proper orientation for attachment to a cow's teat and can cause the mouthpiece of the inflation to engage a cow's teat at an angle and/or to exert a side force on the teat. This can cause discomfort for the cow. More importantly, such a side force can cause the opening to become slightly distorted, resulting in a non-uniform seal around the teat and undesirable admission of air through the mouthpiece opening which can cause slurping and produce unhealthy conditions for the teat.

The above-identified Hein U.S. Pat. No. 2,694,379 discloses forming a weakened portion of reduced wall thickness in the milking tube adjacent the milker claw. This weakened portion is designed to cause the milking tube to collapse or crimp and shutoff air flow therethrough when a teat cup falls off a cow's teat. Thus, such an arrangement could not be used to solve the above-described problem.

SUMMARY OF THE INVENTION

An object of the invention is to provide a milking inflation including simple, inexpensive means for increasing the capability of the stem portion of the milking tube section to be bent or flexed for proper orientation of the shell for attachment of the mouthpiece to a cow's teat.

Another object of the invention is to provide such a milking inflation having improved teat-hanging characteristics.

Another object of the invention is to provide such a milking inflation having a milking tube portion which includes a substantially crevice-free inner wall defining a flow passage therethrough and which can be easily bent or flexed to facilitate installation of the inflation onto a cow's teat without substantial crimping which causes a reduction in the internal cross sectional area of a flow passage extending through the milking tube portion.

Other objects, aspects and advantages of the invention will become apparent to those skilled in the art upon reviewing the following detailed description, the drawing, and the appended claims.

The milking inflation of the invention is made from an elastomeric material, such as a rubber composition, is adapted for installation in a teat cup shell and has an elongated milking tube section extending from the lower end of the shell. The milking tube section includes an elongated stem portion and a claw end portion extending from the lower end of the stem portion. The stem portion includes a substantially crevice-free inner wall defining a flow passage extending therethrough. A circumferentially extending, generally V-shaped groove(s) is provided in the exterior wall of the stem portion near the lower end of the shell and/or adjacent the claw end portion. Such groove(s) is arranged to permit substantial relative bending of portions adjacent the groove without substantial crimping which causes reduction in the internal cross sectional area of the flow passage extending through the stem portion. The resulting flexibility facilitates installation of the teat cup assembly on a cow's teat and provides improved teat-hanging characteristics.

The groove(s) preferably includes a sharp pointed bottommost portion having a longitudinal dimension which does not exceed about 1/32 inch. The wall thickness of the stem portion at the bottommost portion of the groove preferably is about 20 to about 50% of the wall thickness of the stem portion and the longitudinal dimension of the groove at the outer surface of the exterior wall of the stem portion preferably is about ¼ to about 3/16 inch.

In one embodiment, the milking inflation is a one-piece unit and has a shell section which extends from the milking tube section and is adapted to fit inside the teat cup shell. The milking tube section includes an externally enlarged retaining section between the shell section and the stem portion and located adjacent the lower end of the shell when the inflation is installed therein. The groove in the upper end of the stem portion is located at the juncture between the retaining portion and the stem portion.

In one embodiment, the inflation is a multi-piece unit and includes a separate shell portion which is adapted to fit inside the shell and has a lower end portion adapted to extend through an opening in the lower end of the shell and to be folded back over the outer surface of the shell. The milking tube section is a separate part and includes a cup-shaped upper end portion extending from the upper end of the stem portion and adapted to fit over such folded back portion. The groove in the upper end of the stem portion is adjacent the juncture between the stem portion and the cup-shaped upper end portion.

In one embodiment, the inflation is a multi-piece unit including a separate shell section which is adapted to fit inside a teat cup shell and has a lower end portion adapted to extend through an opening in the bottom of the shell. The inflation further includes a rigid sleeve connector having an upper end adapted to fit inside the lower end of the shell section and press the outer surface thereof into sealing engagement with the shell and a lower end adapted to receive the upper end of the stem portion of the milking tube section which is a separate part. The groove in the upper end of the sleeve portion is located below and adjacent the lower end of the connector.

BRIEF DESCRIPTION OF THE DRAWING

FIG. 1 is a partially sectioned, side elevational view of a teat cup assembly carrying a milking inflation of the invention, shown with the mouthpiece attached to a cow's teat and the milking tube section connected to a nipple on a milker claw.

FIG. 2 is an enlarged, sectioned, side elevational view of the milking inflation shown in FIG. 1.

FIG. 3 is a sectioned, side elevational view of an alternate type milking inflation incorporating the invention.

FIG. 4 is a sectioned, side elevational view of a further alternate type of a milking inflation incorporating the invention.

FIG. 5 is an enlarged, fragmentary, sectional view of the milking tube section in the vicinity of the upper groove.

FIG. 6 is an enlarged, fragmentary, sectional view of the milking tube section in the vicinity of the lower groove.

DESCRIPTION OF THE PREFERRED EMBODIMENTS

Illustrated in FIG. 1 is a teat cup assembly 10 including a rigid, generally cylindrical outer shell 12 which surrounds and supports a liner or inflation 14 connected to a milker claw 16 (shown fragmentarily). The milker claw 16 is connected to a suitable vacuum system (not shown) in the usual manner and includes a plurality of nipples 18 (one shown) which project upwardly and outwardly and have a beveled outer end 20.

The shell 12 is formed from a metal, such as stainless steel, or another suitable rigid material, such as a synthetic thermoplastic or a thermosetting resin. The shell 12 has a bottom 22 including an opening 24 of reduced diameter and an upper end terminating in a rim 28.

Located in the side of the shell 12 is a nipple 28 connected, via suitable tubing (not shown), in communication with a pulsator which alternately opens to atmospheric pressure and evacuates the chamber between the interior wall of the shell 12 and the inflation 14 to alternately contract and expand the inflation for milking.

The inflation 14 is a tubular member molded from a flexible or elastomeric material, preferably a synthetic or natural rubber composition including curing agents and the like. In the construction illustrated in FIGS. 1 and 2, the inflation 14 is a one-piece unit and includes an elongated, generally cylindrical suction sleeve or barrel section 30 which fits inside the shell 12, a head section 32 which fits over the shell rim 28 and has a mouthpiece 34 including a circular opening 36 for receiving a cow's teat and a generally cylindrical, reduced diameter milking tube section 38 which extends from the shell 12.

The head end section 32 has a peripheral, downwardly extending cuff 40 which surrounds and fits snugly over the upper end of the shell 12 and sealingly engages the shell rim 28. The milking tube section 38 includes an externally enlarged or thicker-walled shell end or retaining portion 42 which is squeezed through the opening 24 in the shell lower end 22 by pulling on the milking tube section 38 after the cuff 40 is fitted into place over the shell rim 28. The shell end or retaining portion 42 has a flange 44 which surrounds the shell opening 24 and is retained in sealing engagement with the shell 12 after the milking tube section 38 is released.

As best shown in FIG. 2, the milking tube section 38 also includes an elongated stem portion 46 having an upper end 48 connected to the shell end or retaining portion 42. The stem portion 46 includes a substantially crevice-free inner wall 51 defining a flow passage 52 extending therethrough. The inner wall 51 should be smooth or at least substantially crevice free in order to facilitate cleaning between milking operations. If the inner wall 51 has corrugations or similar crevices, it is difficult to remove all the residual milk and know that it has been removed, particularly after the inflation has been allowed to sit long enough for the milk to dry.

The milking tube section 38 further includes a claw end portion 50 which extends from the lower end 53 of the stem portion 4 and is adapted to be slipped onto a claw nipple 18. The claw end portion 50 preferably includes an externally enlarged reinforcement section 54 located in the region near the outer end 20 of the claw nipple 18 and having a wall thickness somewhat greater than the wall thickness of the stem portion 46.

When the teat cup 10 is in the position illustrated by solid lines in FIG. 1 with the mouthpiece 34 of the inflation 14 slipped onto a cow's teat, milk flows through the inflation 14, through the claw nipple 18 and into the claw 16. When the teat cup 10 is removed from a cow's teat and drops to the position shown in phantom in FIG. 1, the inner wall of the claw end portion 50 of the milking tube section 38 sealingly engages the beveled end 20 of the claw nipple 18 to shut off communication between the claw 16 and the atmosphere. Thus, the vacuum within the vacuum system is maintained, even though one or more of the teat cups have dropped from cooperative engagement with the cow's teat.

The reinforcement section 54 is arranged to provide protection against tears, splits, and cuts and yet be flexible enough to ensure complete shutoff. A preferred arrangement for the reinforcement section 54 is disclosed in U.S. Pat. No. 4,324,201 which is incorporated herein by reference.

The inside diameter of the stem portion 46 typically is in the order of about 7/16 to ½ inch and the wall thickness typically is in the order of about 3/16 inch. The stem portions of conventional large tube inflations can be relatively stiff and ordinarily resist bending when the teat cup assembly is lifted upwardly for attachment to a cow's teat. Consequently, the mouthpiece can engage the cow's teat an at angle and/or exert a side force on the teat with the attendant problem discussed above.

The stem portion 46 is arranged to minimize this undesirable condition. This is accomplished by providing in the stem portion 46 a circumferentially-extending notch or groove 55 at a location near the lower end 22 of the shell 12 and/or a circumferentially-extending notch or groove 56 at a location adjacent the upper end 58 of the claw end portion 50 which is located above the outer end of the claw nipple 18. The grooves 55 and 56 are arranged to permit relative bending between the stem portion 46 and the retaining portion 42 and between the stem portion 46 and the claw end portion 50, respectively, without substantial crimping which causes a reduction in the internal cross sectional area of the flow passage 52. The grooves 55 and 56 preferably extend around the entire circumference of the stem portion 46 so that this bending action can take place in any radial direction throughout 360°. Thus, the grooves 55 and 56 function somewhat like swivel joints.

To best perform the desired function, the grooves 55 and 56 are located adjacent a relatively thick or stiff portion or adjacent an internal support and are shaped with a sharp bottom and generally tapered side walls which provide a clearance space to permit one portion of the stem portion 46 to be folded toward another portion without substantial crimping.

In the specific instruction illustrated in FIGS. 1 and 2, the groove 55 is located at the juncture between the stem portion 46 and the enlarged retaining portion 42. The added wall thickness of the retaining portion 42 provides resistance for minimizing crimping when there is relative bending between the stem portion 46 and the shell 12. The claw nipple 18 provides internal support for resisting crimping when there is relative bending between the stem portion 46 and the claw end portion 50. The added wall thickness of the reinforcement section 54 provides further resistance for minimizing crimping. It should be understood that the invention can be incorporated into milking inflations which do not have reinforced claw end portions as well as those which do.

As a guide, the wall thickness of the stem portion 46 at the bottommost portion 60 of each groove 55 and 56 can be about 20 to about 50% of the wall thickness of the stem portion 46. The side walls 110 and 112 of the upper groove 55 and the side walls 114 and 116 of the lower groove 56 preferably converge to a relatively sharp point as illustrated in FIGS. 5 and 6. That is, the grooves 55 and 56 preferably are generally V-shaped. The longitudinal dimension of the area of minimum wall thickness, i.e., longitudinal dimension of the bottommost portion 60 (designated by the letter B) should not exceed about 1/32 inch. Greater longitudinal dimensions in this area tend to provide a higher than desired amount of flexibility, resulting in crimping at the bottommost portion 60. While somewhat less important, the longitudinal dimension of the grooves 55 and 56 at the outer surface (designated by the letter A) of the stem portion 46 should be about ⅛ to about 3/16 inch.

The curved side wall 110 and the beveled or tapered side wall 112 of the upper groove 55 permit substantial relative bending between the stem portion 46 and the retaining portion 42 at the bottommost portion 60 before the side walls touch. Likewise, the beveled or tapered side walls 114 and 116 of the lower groove 56 permit substantial relative bending between the stem portion 46 and the reinforcement section 54.

The effect of the additional flexibility and swivel-like action afforded by the grooves 55 and 56 is illustrated in FIG. 1. The grooves 55 and 56 afford easy relative bending between the upper end of the stem portion 46 and the retaining portion 42 and between the lower end of the stem portion 46 and the reinforcement section 54. This permits the milking tube section 38 to be bent into a generally S-shape as illustrated without reducing the cross sectional area of the flow passage 52. While the stem portion 46 can be bent to the degree shown, the bend is somewhat less during normal use. Accordingly, FIG. 1 is intended to illustrate the degree of flexibility imparted by the grooves 55 and 56 and not the condition under actual use.

The teat cup assembly 10 can be conveniently vertically oriented for installation on a cow's teat. The force required to bend the milking tube section 38 into such a shape is relatively low, so the side forces exerted on the cow's teat after installation are minimal. As a result, the teat cup assembly 10 hangs comfortably from the cow's teat and distortion of the mouthpiece opening 36 is minimized.

In some constructions only one groove, either the upper groove 55 or the lower groove 56, provide sufficient bending to accommodate misalignment. However, in many cases use of both an upper groove 55 and a lower groove 56 is preferred. If only one groove is used, the upper groove 55 is preferred because, during molding, it can be conveniently formed into the configuration which permits an angular misalignment up to about 30°–35° without crimping. It is usually more difficult to mold the lower groove 56 with a configuration which permits an angular misalignment much over about 15° without crimping.

FIG. 3 illustrates a three-piece type milking inflation 60 including a separate shell part 62 (illustrated fragmentarily) having a lower end 64 which fits inside an opening 66 in the lower end of a shell 68. The inflation 60 also includes a separate milking tube part 70 having an elongated stem portion 46a similar to stem portion 46 above and a reinforcement section 54a similar to reinforcement section 54 above. The inflation 60 further includes a sleeve connector 72 having an enlarged upper end portion 74 which fits inside the lower end 66 of the shell part 62 and presses the outer wall of the lower end 64 into sealing engagement with the shell opening 66. The sleeve connector 72 has a reduced lower end portion 76 which receives the upper end 78 of the milking tube part 70.

The stem portion 46a of the milking tube part 70 includes a generally V-shaped, circumferentially extending notch or groove 55a located near the lower end of the shell 68 and/or a generally V-shaped, circumferentially extending notch or groove 56a located adjacent the upper end 80 of the reinforcement section 52a. The grooves 55a and 56b are arranged and function in substantially the same manner as grooves 55 and 56 described above. In the specific construction illustrated in FIG. 3, the groove 55a is located in a region adjacent the lowermost end 82 of the sleeve connector 72 which provides internal support for resisting crimping like the retaining portion 42 in the embodiment discussed above.

FIG. 4 illustrates a two-piece type milking inflation 90 including a separate shell part 92 (illustrated fragmentarily) which fits inside a shell 94 and has a lower end portion 96 which extends through the open lower end 98 of the shell 94 and is folded back over the outer surface of the lower end of the shell 94. The inflation 90 also includes a separate milking tube part 100 having a stem portion 46b similar to stem portion 46 above and a reinforcement section 54b similar to reinforcement section 54 above. The milking tube part 100 has an enlarged, cup-shaped upper end portion 102 which fits over and sealingly engages the folded over portion 104 of the shell part 92.

The stem portion 46b of the milking tube part 100 includes a generally V-shaped groove 55b located near the lower end of the shell 98 and/or a generally V-shaped groove 56b located adjacent the upper end 106 of the reinforcement section 54b. The grooves 55b and 56b are arranged and function in substantially the same manner as the grooves 55 and 56 described above. In the specific construction illustrated in FIG. 4, the groove 55b is located at the juncture between the thicker, cup-shaped portion 102 and the upper end 108 of the stem portion 46b.

From the foregoing description, one skilled in the art can easily ascertain the essential characteristics of the invention and, without departing from the spirit and scope thereof, make various changes and modifications to adapt it to various usages.

I claim:

1. A milking inflation for use with a teat cup assembly including a rigid shell having a lower end, said inflation being made from an elastomeric material and having an elongated tubular milking tube section extending from the lower end of the shell, said milking tube section including an elongated stem portion having an exterior wall including an outer surface; upper and lower end portions and a substantially crevice-free inner wall defining a flow passage therethrough;

a circumferentially-extending, generally V-shaped groove in the outer surface of said exterior wall of said stem portion at a location below and spaced from the lower end of the shell and adjacent a thicker part or an internally supported part of said stem portion, said groove having a sharp bottom and being arranged to permit substantial movement of the shell relative to said stem portion without substantial crimping which causes a reduction in the cross sectional area of said flow passage.

2. A milking inflation according to claim 1 wherein said groove includes a bottommost portion having a longitudinal dimension which does not exceed about 1/32 inch.

3. A milking inflation according to claim 2 wherein the thickness of said stem portion at said bottommost portion is about 20 to about 50% of the thickness between said inner and exterior walls of said stem portion.

4. A milking inflation according to claim 3 wherein the longitudinal dimension of said groove at the outer surface of said exterior wall of said stem portion is about ¼ to about 3/16 inch.

5. A milking inflation according to claim 4 wherein
said inflation is a one-piece unit including a shell section extending from said milking tube section and adapted to fit inside the shell;
said milking tube section includes an externally enlarged retaining portion between said shell section and the upper end of said stem portion and located adjacent the lower end of the shell when said inflation is installed in the shell; and
said groove is located at the juncture between said retaining portion and the upper end of said stem portion.

6. A milking inflation according to claim 4 wherein
said inflation is multiple-piece unit including a separate shell section adapted to fit inside the shell and having a lower end portion which is adapted to extend through an opening in the lower end of the shell and to be folded back over the outer surface of the shell;
said milking tube section is a separate part and includes a cup-shaped upper end portion extending from the upper end of said stem portion and adapted to fit over said folded back portion; and
said groove is located adjacent the juncture between the upper end of said stem portion and said cup-shaped upper end portion.

7. A milking inflation according to claim 4 wherein
said inflation is a multi-piece unit including a separate shell section adapted to fit inside the shell and having a lower end portion which is adapted to extend through an opening in the lower end of the shell and further including a sleeve connector having an upper end adapted to fit inside said shell lower end portion and press the outer surface thereof into sealing engagement with the shell opening and a lower end adapted to receive the upper end of said stem portion of said milking tube section.
said milking tube section is a separate part; and said groove is located below and adjacent the lower end of said connector.

8. A milking inflation for use with a teat cup assembly including a rigid shell having a lower end, said inflation being made from an elastomeric material and having an elongated tubular milking tube section extending from the lower end of the shell, said milking tube section including an elongated stem portion having an exterior wall including an outer surface, upper and lower end portions, and a substantially crevice-free inner wall defining a flow passage extending therethrough;

a circumferentially extending, generally V-shaped groove in the outer surface of said exterior wall of said stem portion below and spaced from the lower end of the shell arranged to permit substantial movement of the shell relative to said stem portion without substantial crimping which causes a reduction in the cross sectional area of said flow pasage, said groove including a bottommost portion having a longitudinal dimension which does not exceed about 1/32 inch with the thickness of said stem portion at said bottommost portion being about 20 to about 50% of the thickness between said inner and exterior walls of said stem portion and the longitudinal dimension of said groove at the outer surface of said exterior wall being about ¼ to about 3/16 inch.

9. A milking inflation according to claim 8 wherein
said inflation is a one-piece unit including a shell section extending from said milking tube section and adapted to fit inside the shell;
said milking tube portion includes an externally enlarged retaining portion between said shell section and the upper end of said stem portion and located adjacent the lower end of the shell when said inflation is installed in the shell; and
said groove is located at the juncture between said retaining portion and the upper end of said stem portion.

* * * * *